US008568681B2

(12) United States Patent
Kouvetakis et al.

(10) Patent No.: US 8,568,681 B2
(45) Date of Patent: Oct. 29, 2013

(54) HYDRIDE COMPOUNDS WITH SILICON AND GERMANIUM CORE ATOMS AND METHOD OF SYNTHESIZING SAME

(75) Inventors: John Kouvetakis, Mesa, AZ (US); Cole J. Ritter, Phoenix, AZ (US); John Tolle, Gilbert, AZ (US)

(73) Assignee: Arizona Board of Regents, a body corporate of the State of Arizona acting for and on behalf of Arizona State University, Scottsdale, AZ (US)

( * ) Notice: Subject to any disclaimer, the term of this patent is extended or adjusted under 35 U.S.C. 154(b) by 3 days.

(21) Appl. No.: 13/180,961

(22) Filed: Jul. 12, 2011

(65) Prior Publication Data
US 2012/0020864 A1 Jan. 26, 2012

Related U.S. Application Data

(63) Continuation of application No. 11/662,722, filed as application No. PCT/US2004/043854 on Dec. 31, 2004, now Pat. No. 7,981,392.

(60) Provisional application No. 60/610,120, filed on Sep. 14, 2004.

(51) Int. Cl.
C01B 33/00 (2006.01)
(52) U.S. Cl.
USPC ............................ 423/324; 423/644; 117/939
(58) Field of Classification Search
USPC .................................. 423/324, 644; 117/939
See application file for complete search history.

(56) References Cited

U.S. PATENT DOCUMENTS

| 2,988,427 | A | 6/1961 | Jenker et al. |
| 4,777,023 | A | 10/1988 | Fieselmann et al. |
| 4,910,153 | A | 3/1990 | Dicksen et al. |
| 2004/0040493 | A1 | 3/2004 | Vineis et al. |
| 2008/0113186 | A1 | 5/2008 | Kouvetakis et al. |
| 2009/0050935 | A1 | 2/2009 | Kouvetakis et al. |
| 2010/0012972 | A1 | 1/2010 | Kouvetakis et al. |

FOREIGN PATENT DOCUMENTS

WO 2004036631 4/2004

OTHER PUBLICATIONS

Apeloig et al. "Reversal of Stereoselectivity in the Reduction of gem-Dichlorides by Tributyltin Hydride and Tris(trimethylsilyl)silane. Synthetic and Mechanistic Implications." J. Am. Chem. Soc. 1994, 116, pp. 10781-10782.*
STIC search, Mar. 2012.*
Lobreyer et al. "Dehydrogenative Addition Reactions for Silyl-Substituted Alkali Metal Germanides, Stannides, and Phosphides; Molecular Structure of Neopentasilane", Chem. Ber., vol. 127, pp. 2111-2115, 1994.*
English translation of "Dehydrogenative Addition Reactions for Silyl-Substituted Alkali Metal Germanides, Stannides, and Phosphides; Molecular Structure of Neopentasilane", Chem. Ber., vol. 127, pp. 2111-2115, 1994 (Translated May 2012).*
Chizmeshya, et al., J. Am. Chem. Soc. 2006, 128 (21), 6919-6930.
Gersten, et al., The Physics and Chemistry of Materials, John Wiley & Sons; New York, 2001, pp. 96-100.
Dutton, et al., Inorganic Chemistry, 1988, 7(9), pp. 1735-1739.
Lobreyer, T., Chem Ber, 1991, 124(11), 2405-2410.
Mackay, K.M., et al, J. Chem Soc, 1969, A, 2938.
Mooney, P. M.; et al. Annu. Rev. Mater. Sci. 2000, 30, 335.
Tromp, R. M.; et al. Annu. Rev. Mater. Sci. 2000, 30, 431.
Brunner, K., et al., Rep. Prog. Phys. 2002, 65(1), 27-72.
Kuo, Y-H; et al. Nature 2005, 437, 1334.
Bean, J, C; et al. J. Vac Sci, Technol. 1984, A 2(2), 436-440.
Greve, D.W., Mat. Sci. Eng., 1993, B18(1), 22-51.
Konig, U., et al., IEEE Electron Device Lett, 1993, 14(4), 205-207.
M. L. Lee, J. Appl. Phys. 2003, 94, 2590-2596.
R. Hamond, Electron. Lett. 1999, 35(18), 1590-1591.
Y. J. Mii, Appl. Phys. Lett., 1991, 59(13), 1611-1613.
P. M. Mooney, Appl. Phys. Lett., 1995, 67(16), 2373-2375.
K. K. Linder, Appl. Phys Lett., 1997, 70(24), 3224-3226.
C. S. Peng, Appl. Phys. Lett., 1998, 72(24), 3160-3162.
Lee, M. L..; et al. J. Vac. Sci.Technol. 2004, B 22 (1), 158.
E. Kasper, et al., Appl Surf. Sci, 2004, 224, 3.
Currie, M. T.; et al. Appl. Phys. Lett. 1998, 72 (14), 1718.
G. Eres, et al., J. Vac. Sci. Technol., 1993, A11(5), 2463-2471.
T. R. Bramblett, et al. J. Appl. Phys., 1995, 77(4), 1504-1513.
J. Takahashi, et al., Appl. Phys. Lett., 1991, 58(24), 2776-2778.
Ritter, C.J.; et al. J. of the Am. Chem. Soc., 2005, 127(27), 9855-9864.
Hu, C.-W.; et al. Applied Physics Letters, 2005, 87(18), 181903/1-3.
Nijhawan, S.; et al. J. Aerosol Science 2003, 34, 691-711.
Soldner, M.; et al. J. Organometallic Chem. 1996, 521, 295.
Urban, J.; et al. J. Chem. Phys. Lett. 1997, 264, 441-448.
Albinsson, B.; et al. J. Phys. Chem. 1996, 100, 8681.
Jasinski, J. M.; et al. Chem. Rev, 1995, 95, 1203.
Cullis, A.G.; et al. J. Cryst. Growth 1992, 123, 333.

(Continued)

Primary Examiner — Paul Wartalowicz
(74) Attorney, Agent, or Firm — McDonnell Boehnen Hulbert & Berghoff LLP

(57) ABSTRACT

A method is provided for synthesizing silicon-germanium hydride compounds of the formula $(H_3Ge)_{4-x}SiH_x$, wherein x=0, 1, 2 or 3. The method includes combining a silane triflate with a compound having a $GeH_3$ ligand under conditions whereby the silicon-germanium hydride is formed. The compound having the $GeH_3$ ligand is selected from the group consisting of $KGeH_3$, $NaGeH_3$ and $MR_3GeH_3$, wherein M is a Group IV element and R is an organic ligand. The silane triflate can be $H_xSi(OSO_2CF_3)_{4-x}$ or $H_xSi(OSO_2C_4F_9)_{4-x}$. The method can be used to synthesize trisilane, $(H_3Si)_2SiH_2$, and the iso-tetrasilane analog, $(H_3Si)_3SiH$, by combining a silane triflate with a compound comprising a $SiH_3$ ligand under conditions whereby the silicon hydride is formed. The silane triflate can include $H_xSi(OSO_2CF_3)_{4-x}$ or $H_xSi(OSO_2C_4F_9)_{4-x}$ wherein x=1 or 2. A method for synthesizing $(H_3Ge)_2SiH_2$ includes combining $H_3GeSiH_2(OSO_2CF_3)$ with $KGeH_3$ under conditions whereby $(H_3Ge)_2SiH_2$ is formed.

9 Claims, 4 Drawing Sheets

(56) References Cited

OTHER PUBLICATIONS

Hu, et al. (2003) Chemistry of Materials: American Chemical Society, 15(19):3569-3572.
Bauer, et al. (2003) Applied Physics Letters, 83(11): 2163-2165.
Wolf, et al. (1986) Processing for the VLSI ERA. vol. 1: Process Technology; Lattice Press; Sunset Beach, CA; Chapter 6, pp. 161-197.
Gaiduk, et al. (2000) Thin Solid Films, 367 (1-2): 120-125.
Supplemental ISR EP 05746524, mailed Jan. 31, 2011.

* cited by examiner

HYDRIDE COMPOUNDS WITH SILICON AND GERMANIUM CORE ATOMS AND METHOD OF SYNTHESIZING SAME

RELATED APPLICATION DATA

This application is based on and claims the benefit of U.S. Provisional Patent Application No. 60/610,120 filed on Sep. 14, 2004, the disclosure of which is incorporated herein by this reference.

STATEMENT OF GOVERNMENT FUNDING

The United States Government provided financial assistance for this project through the National Science Foundation under Grant Nos. DMR-0221993, ARO DAAD19-00-1-0471 and AFRL/SNHC F19628-03-C-0056. Therefore, the United States Government may own certain rights to this invention.

BACKGROUND

This invention relates generally to silicon-germanium hydrides and silicon hydride analogs. More particularly, it relates to the synthesis of silicon-germanium hydrides having the molecular formula $(H_3Ge)_{4-x}SiH_x$, wherein x=0, 1, 2 or 3 and silicon hydride analogs thereof.

Synthesis and development of electronic and optical materials as well as devices based on the Si—Ge and related group IV alloy semiconductor systems, such as Si—Ge—C and Si—Ge—Sn, is currently of interest due to the potentially useful electronic and optical properties of these systems. Commercial fabrication of such systems traditionally has been achieved via chemical vapor deposition (CVD) of disilane $(SiH_3)_2$ and digermane $(GeH_3)_2$. However, the development of new and useful materials based on these systems with device quality morphological and structural properties requires new low temperature growth methods. Trisilane, $(H_3Si)_2SiH_2$, is currently used for commercial growth of strained Si channel devices on Si—Ge buffered silicon. A major advantage of trisilane relative to traditional Si hydrides is its higher reactivity, allowing low temperature growth conditions compatible with development of strained Si channels. Previously reported methods for synthesizing trisilane, however, have significant drawbacks. They are based on electric silent discharge of lower Si-hydrides, which typically produce mixtures of materials at low yields. To isolate the trisilane product in pure form, complicated separation and purification procedures need to be employed.

Previous reports discuss the potential synthesis of tetragermylsilane, $Si(GeH_3)_4$. W. Dutton and M. Onyszchuk, Inorganic Chemistry volume 7, number 9, 1968. To the best of our knowledge, however, no definitive proof of its existence as a pure product possessing the correct stoichiometry has been provided thus far. The previously reported NMR data revealed a mixture of products and the reported elemental analysis corresponding to $Si(GeH_3)_4$ was incorrect. Furthermore, the synthetic method described is unsuitable for producing the compound for commercial applications such as for use as a CVD source.

L. Lobreyer and Sundermeyer *Chem. Ber.* 1991, 124(11), 2405-2410, have previously reported a synthetic method to the compound $H_3Ge$—$SiH_3$. Their synthetic methodology, however, did not afford high enough yields for practical use as a CVD source for the synthesis of semiconductor systems.

It an object of the present invention to provide compounds that display the necessary physical and chemical properties to be viable precursors for chemical vapor deposition (CVD) of Si—Ge semiconductors and related group IV alloys.

It is still another object of the present invention to provide a method for synthesizing such compounds that utilizes high-yield single-step substitution reactions involving commercially available starting materials.

It is yet another object of the present invention to provide a method for synthesizing trisilane that utilizes high-yield single-step substitution reactions involving commercially available starting materials.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a new and practical method for synthesizing the family of silicon-germanium hydride compounds of the molecular formula $(H_3Ge)_{4-x}SiH_x$, wherein x is equal to 0, 1, 2 or 3. These compounds possess simple tetrahedral structures in which a single silicon center atom, Si, is bonded to a hydrogen atom, H, and one or more germyl groups, $GeH_3$. The compounds have facile reactivities and precise atomic arrangements incorporating direct Si—Ge bonds. We have prepared the $(H_3Ge)_2SiH_2$, $(H_3Ge)_3SiH$ and $(H_3Ge)_4Si$ species of this family of compounds for the first time and have isolated these species as volatile colorless liquids that display the necessary physical and chemical properties to be viable precursors for chemical vapor deposition (CVD) of Si—Ge semiconductors and related group IV alloys.

According to one aspect of the invention, the method includes combining a silane triflate with a compound comprising a $GeH_3$ ligand under conditions whereby the silicon-germanium hydride is formed. The compound comprising the $GeH_3$ ligand is selected from the group consisting of $KGeH_3$, $NaGeH_3$ and $MR_3GeH_3$, wherein M is a Group IV element and R is an organic ligand. According to one advantageous method, the silane triflate can comprise $H_xSi(OSO_2CF_3)_{4-x}$ or $H_xSi(OSO_2C_4F_9)_{4-x}$.

According to another aspect of the invention, an alternative method is provided for synthesizing $(H_3Ge)_2SiH_2$. The method comprises combining $H_3GeSiH_2(OSO_2CF_3)$ with $KGeH_3$ under conditions whereby $(H_3Ge)_2SiH_2$ is formed.

According to yet another aspect of the invention, we have provided a new and practical method for synthesizing trisilane, $(H_3Si)_2SiH_2$. The same method can be used for synthesis of the iso-tetrasilane analog, $(H_3Si)_3SiH$. The method comprises combining a silane triflate with a compound comprising a $SiH_3$ ligand under conditions whereby the silicon hydride is formed. According to one advantageous method, the silane triflate comprises $H_xSi(OSO_2CF_3)_{4-x}$ or $H_xSi(OSO_2C_4F_9)_{4-x}$ wherein x=1 or 2.

We have synthesized trisilane in practical yields by a straightforward approach that is convenient and potentially less expensive than previously known methods, and we have thereby demonstrated that trisilane can be used as a low temperature single-source alternative to the commercially available derivatives such as disilane $(SiH_3)_2$ and digermane $(GeH_3)_2$ for industrial and research applications. Potentially, this method affords iso-tetrasilane $(H_3Si)_3SiH$ in high yields. The more reactive iso-tetrasilane $(H_3Si)_3SiH$ is expected to be a better candidate for low temperature CVD of strained Si layers. Our approach provides a rational and systematic step-by-step mechanism leading to the isolation of the desired materials as the primary product at high yield and purity excluding formation of hazardous byproducts and mixtures.

The synthetic routes of the aforementioned molecules utilize high-yield single-step substitution reactions involving commercially available starting materials. A complete characterization was conducted via a range of spectroscopic and analytical methods such as multinuclear NMR, gas source IR, mass spectrometry and elemental analysis for Si and Ge. The data collectively confirm the assigned molecular structures and correlate well with other related silyl and germyl silanes and methanes. The experimental results compare extremely well with first principles calculations of the spectroscopic and bonding properties of the molecules. A detailed investigation of the physical and chemical properties has shown that the compounds can be purified to yield semiconductor grade materials that are highly suitable for industrial application in Si-based technologies and manufacturing processes.

The synthesis method according to our invention presents a new and straightforward approach that can afford a low temperature CVD route to Ge rich $Si_{1-x}Ge_x$ (x>50 at. %) alloys, which currently have crucial application in the areas of optoelectronic IR devices as well as buffer layers and virtual substrates with tunable morphology composition, structure and strain. These buffer layers are used as templates for growth of strained Si and Ge films (channels) that have applications in high mobility electronic devices.

BRIEF DESCRIPTION OF THE DRAWINGS

The accompanying drawings, which are incorporated in and constitute a part of the specification, illustrate the presently preferred embodiments and methods of the invention. Together with the general description given above and the detailed description of the preferred embodiments and methods given below, they serve to explain the principles of the invention.

DESCRIPTION

Synthesis of $(H_3Ge)_2SiH_2$, $(H_3Ge)_3SiH$ and $(H_3Ge)_4Si$

Figure 1:
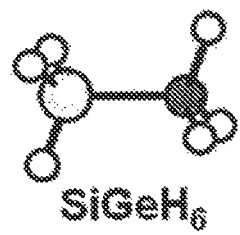
FIG. 1 shows the molecular structure of the most common configuration of $SiH_3GeH_3$ obtained according to the method of the present invention.

According to one aspect of our invention, we provide a method for synthesizing compounds of digermylsilane $(H_3Ge)_2SiH_2$, trigermylsilane $(H_3Ge)_3SiH$ and tetragermylsilane $(H_3Ge)_4Si$. A preferred method is carried out by reactions of the corresponding silane-triflates with appropriate concentrations of potassium germyl in suitable solvents as illustrated by the following equations:

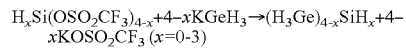

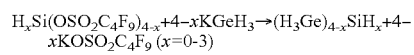

We have synthesized and fully characterized most of the triflate substrates utilized in our work for the first time. A relevant and useful silyl-triflate chemistry review was reported recently by W. Uhlig Chem. Ber. 1996, 129, 733, which is incorporated herein in its entirety by this reference.

(a) Synthesis and Properties of Digermylsilane, $(H_3Ge)_2SiH_2$.

We have synthesized symmetric digermylsilane $(H_3Ge)_2SiH_2$ using the method described above. We conducted this synthesis by the reaction of $H_2Si(OSO_2CF_3)_2$, and potassium germyl, $KGeH_3$, as shown by the equation (1) below:

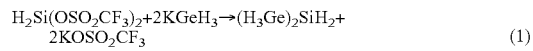

Reaction (1) is carried out in a high boiling point solvent, such as n-decane, at 0° C. The low vapor pressure of decane allows for a convenient and effective separation and purification of the compound from the solvent. The product is obtained in 20%-25% yield as a colorless, air-sensitive and volatile liquid with a vapor pressure of 30 torr at 22° C. and 17 torr at 0° C. $H_3Ge$—$SiH_2$—$GeH_3$ is thermally stable at 22° C., and it less reactive with air and much safer than the $H_3GeGeH_3$ analog. The substantial vapor pressure and sufficient thermal stability of $H_3Ge$—$SiH_2$—$GeH_3$ suggest that the molecule could be a highly suitable single-source CVD precursor to silicon-germanium semiconductor alloys. Notably, this compound appears to possess higher stability than the well known homonuclear analogs such as trisilane $(H_3Si)_2SiH_2$, and digermane $H_3GeGeH_3$ which are currently commercially available and are considered the gas sources of choice for low temperature deposition of Si-based devices including high mobility strained Si channels. $H_3Ge$—$SiH_2$—$GeH_3$ offers the possibility of becoming a safer and more efficient alternative to these compounds in the preparation of Si—Ge alloys with high Ge-rich concentrations. These alloys are much more difficult to grow in device quality form and are highly sought for important application in modern optical devices including ER photodetectors and sensors fully integrated with silicon technologies.

The $(H_3Ge)_2SiH_2$ compound is readily identified and characterized by its infrared (IR), NMR, and mass spectra. Its IR spectrum in vapor form is relatively simple and shows two sharp absorptions at 2152 cm$^{-1}$ and 2074 cm$^{-1}$ which are assigned to the Si—H and Ge—H stretching modes, respectively. These assignments are consistent with the literature values of the $H_3SiGeH_3$ compound as described by J. Urban, P. R. Schreiner, G. Vacek, P. v. R. Schleyer, J. Q. Huang, J. Leszczynski, Chem. Phys. Lett. 1997, 264, 441-448. The intensity of the Ge—H peak in the $H_3Ge$—$SiH_2$—$GeH_3$ spectrum is significantly stronger than the Si—H peak which is consistent with the greater number of Ge—H bonds versus Si—H bonds in the molecule. Other prominent absorptions at 805 cm$^{-1}$ and 702 cm$^{-1}$ are attributed to Si—H and Ge—H bending modes, respectively. A weak band at 324 cm$^{-1}$ can be attributed to the skeletal Si—Ge stretching mode. A more detailed interpretation of the full IR spectrum is obtained from ab initio quantum chemical calculations and it is described below. The mass spectrum of the compound displays well-defined isotopic envelopes for (M$^+$-nH) and (M$^+$-GeH$_3^+$), suggesting a (H$_3$Ge)$_2$SiH$_2$ structure in which a central SiH$_2$ group is bonded with two terminal GeH$_3$ ligands. The $^1$H NMR spectra are consistent with the proposed structure. The spectra show the expected triplet centered at 3.106 ppm (δ Ge—H) due to the GeH$_3$ moieties and a septet at 3.396 ppm (δ Si—H) due to SiH$_2$. The integrated Ge—H/Si—H proton ratio in the NMR spectrum is 3:1, as expected. The NMR frequencies also correlate well with the corresponding chemical shifts of SiH$_3$GeH$_3$, which are reported to be at 3.520 ppm and 3.180 ppm as Si—H and Ge—H quartets, respectively.

We have also prepared (H$_3$Ge)$_2$SiH$_2$ via an alternative two-step process. As shown below, we initially synthesized and isolated the monosubstituted H$_3$GeSiH$_2$(OSO$_2$CF$_3$) compound by reactions of equimolar amounts of PhSiH$_2$GeH$_3$ with HOSO$_2$CF$_3$ in the absence of solvent at −35° C. The synthesis of PhSiH$_2$GeH$_3$ is described in more detail by L. Lobreyer and Sundermeyer, *Chem. Ber.* 1991, 124(11), 2405-2410, which is incorporated herein in its entirety by this reference. Subsequent reactions of H$_3$GeSiH$_2$(OSO$_2$CF$_3$) with KGeH$_3$ affords the disubstituted (H$_3$Ge)$_2$SiH$_2$ product.

(2)

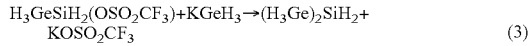

(3)

We isolated the intermediate H$_3$GeSiH$_2$OSO$_2$CF$_3$ species for the first time as a colorless, low-volatility liquid (v.p.=8.0 Torr at 22° C., 3 Torr at 0° C.) at 72% yield. The neat product decomposes slowly at 22° C. over time to give SiH$_3$GeH$_3$ and an unidentified residue, but it remains stable when stored at −25° C. The compound was characterized by gas-phase IR, NMR ($^1$H, $^{13}$C, $^{19}$F) and mass spectrometry and the data collectively are consistent with the proposed H$_3$GeSiH$_2$OSO$_2$CF$_3$ molecular structure (see experimental section for details).

The synthesis of (H$_3$Ge)$_2$SiH$_2$, as described by reaction (2), gives a highly pure product in which the overall yield is slightly higher than obtained via the previous method. Nevertheless, the method shown in reaction (2) has afforded the formation of the new and highly reactive species, (H$_3$Ge)SiH$_2$ (OSO$_2$CF$_3$), which might be a suitable starting material for the synthesis of other useful semiconductor specialty gases that incorporate the direct Si—Ge bonds.

Ab Initio Calculations of Digermylsilane, H$_3$Ge—SiH$_2$—GeH$_3$.

Our data indicate that we have isolated, for the first time, the Si—Ge hydride H$_3$Ge—SiH$_2$—GeH$_3$ with a symmetric propane-like molecular structure. Earlier work based on silent electric discharge of SiH$_4$ and GeH$_4$ produced the asymmetric analog H$_3$Ge—GeH$_2$—SiH$_3$, exclusively. See K. M. Mackay, S. T. Hosfield and S. R. Stobart, *J. Chem. Soc.* (A), 1969, 2938. This indicates that the symmetric species according to our invention might not be stable under the high-energy conditions of the silent discharge process.

To elucidate the structural, vibrational and energetic properties of H$_3$Ge—SiH$_2$—GeH$_3$ we conducted extensive electronic structure calculations which are based on hybrid density function theory (DFT) using the B3LYP functional as implemented in the Gaussian03 and GAMESS codes. A variety of basis sets were employed to study the structural and vibrational trends of H$_3$Ge—SiH$_2$—GeH$_3$ as well as the GeH$_3$—GeH$_2$—SiH$_3$ isomer. In addition the properties of the classical SiH$_3$GeH$_3$ analog were calculated for comparison (see Table 1). Earlier studies of SiH$_3$GeH$_3$ have established the importance of augmenting the basis sets by the inclusion of extra d-type polarization functions on heavy atoms (Si,Ge) and extra p-type polarization functions on the hydrogens. These studies are described by J. Urban, P. R. Schreiner, G. Vacek, P. v. R. Schleyer, J. Q. Huang, J. Leszczynski, *Chem. Phys. Lett.* 1997, 264, 441-448, which are incorporated herein in their entirety by this reference. Accordingly, we performed our calculations using 6-311++G(2d,2p) basis, which also includes additional diffuse orbitals on first and second row atoms.

Figure 4:
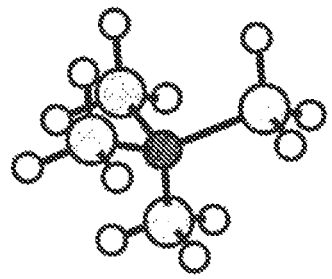
FIG. 4 shows the molecular structure of the most common configuration of $Si(GeH_3)_4$ obtained according to the method of the present invention.
Figure 2:
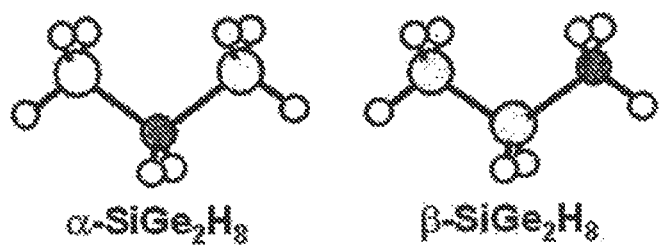
FIG. 2 shows the molecular structure of the most common configurations of $SiGe_2H_8$. The symmetric, (α) $SiH_2(GeH_3)_2$ has been obtained according to the method of the present invention.
Figure 3:
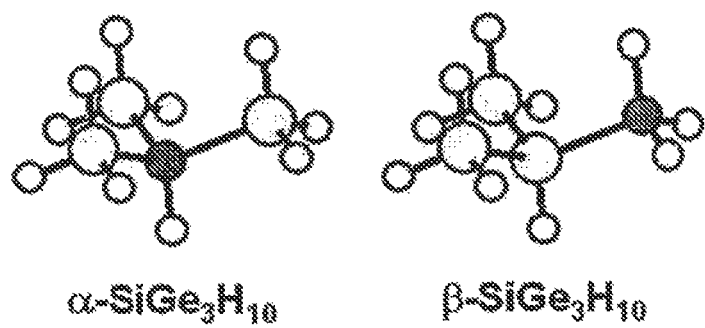
FIG. 3 shows the molecular structure of the most common configuration of $SiGe_3H_{10}$. The symmetric, (α) $SiH(GeH_3)_3$ has been obtained according to the method of the present invention.

FIG. 2 shows the structure of H$_3$Ge—SiH$_2$—GeH$_3$ obtained using the 6-311++G(2d,2p) basis set at the B3LYP level of theory. FIGS. 1, 3 and 4 show concomitant data for the SiH$_3$GeH$_3$, SiH(GeH$_3$)$_3$ and Si(GeH$_3$)$_4$ analogs, respectively, as well as those of plausible isomers. In FIGS. 1-4, hydrogen atoms are represented by white spheres, silicon atoms are represented by small dark gray spheres, and germanium atoms are represented by light gray spheres. Table 1 shows structural and energetic parameters of SiGeH$_6$ and the symmetric, (α), and asymmetric, (β), SiGe$_2$H$_8$ and SiGe$_3$H$_{10}$ molecules. E$_0$ and E$_{th}$ refer to the static and thermally corrected (300° K) electronic molecular energies, respectively. Lengths are given in Angstroms, zero-point energies in kcal/mol, dipole moments in Debye and total energies in Hartree. For the asymmetric (β) species Ge$_1$ refers to central Ge atom in the structures of FIGS. 1-4.

Note that the data for the H$_3$Ge—SiH$_2$—GeH$_3$ and GeH$_3$—GeH$_2$—SiH$_3$ isomers are virtually identical. In particular the Si—Ge, Ge—H and Si—H bond lengths for the H$_3$Ge—SiH$_2$—GeH$_3$ are 2.397 Å, 1.539 Å, and 1.484 Å respectively. These results are slightly larger (+0.003 Å) than the calculated values for SiH$_3$GeH$_3$ which are in excellent agreement with the prior experimental and theoretical data reported by J. Urban, P. R. Schreiner, G. Vacek, P. v. R. Schleyer, J. Q. Huang, J. Leszczynski, *Chem. Phys. Lett.* 1997, 264, 441-448. The <Ge—Si—Ge bond angle (112.1°) is slightly larger than the tetrahedral value, but this is compensated by a slightly reduced value for the <H—Si—H angle (108°). Our calculations also show that the asymmetric isomer is more stable by ~18 kcal/mol than its symmetric counterpart (see Table 1), which is consistent with the formation of the former almost exclusively in the silent discharge experiments.

TABLE 1

| | | Structural and Energetic Parameters | | | | | | | |
|---|---|---|---|---|---|---|---|---|---|
| | iGeH$_6$ | Symmetric(α) SiH$_2$(GeH$_3$)$_2$ | | Asymmetric (β) (SiH$_3$)GeH$_2$(GeH$_3$) | | Symmetric (α) SiH(GeH$_3$)$_3$ | | Asymmetric (β) SiGe$_3$H$_{10}$ | |
| Si—Ge | 2.394 | Si—Ge | 2.397 | Si—Ge$_1$ | 2.398 | Si—Ge | 2.401 | Si—Ge$_2$ | 2.401 |
| | | | | Ge$_1$—Ge$_2$ | 2.445 | | | Ge$_1$—Ge$_2$ | 2.450 |
| Ge—H | 1.539 | Ge—H | 1.539 | Ge$_1$—H | 1.543 | Ge—H | 1.539 | Ge$_2$—H | 1.546 |
| | | | | Ge$_2$—H | 1.539 | | | Ge$_1$—H | 1.539 |

TABLE 1-continued

Structural and Energetic Parameters

| iGeH$_6$ | | Symmetric($\alpha$) SiH$_2$(GeH$_3$)$_2$ | | Asymmetric ($\beta$) (SiH$_3$)GeH$_2$(GeH$_3$) | | Symmetric ($\alpha$) SiH(GeH$_3$)$_3$ | | Asymmetric ($\beta$) SiGe$_3$H$_{10}$ | |
|---|---|---|---|---|---|---|---|---|---|
| Si—H | 1.481 | Si—H | 1.484 | Si—H | 1.482 | Si—H | 1.487 | Si—H | 1.482 |
| | | <GeSiGe | 112.1 | <SiGe$_1$Ge$_2$ | 113.1 | <GeSiGe | 110.6 | <SiGe$_2$Ge$_1$ | 113.1 |
| | | | | | | <H$_{Si}$SiGe | 108.4 | <H$_{Ge}$SiGe | 108.4 |
| | | | | | | <H$_{Ge}$GeSi | 110.5 | <H$_{Ge}$GeSi | 110.9 |
| | | <HSIH | 108.0 | <HGe$_1$H | 107.1 | <H$_{Ge}$GeH$_{Ge}$ | 107.3 | <H$_{Ge}$GeH$_{Ge}$ | 110.6 |
| | | | | | | | | <H$_{Si}$SiH$_{Si}$ | 110.6 |
| ZPE | 29.8 | ZPE | 39.2 | ZPE | 39.9 | ZPE | 49.5 | ZPE | 49.8 |
| D | 0.323 | D | 0.445 | D | 0.147 | D | 0.731 | D | 0.761 |
| E$_0$ + 2370 | −0.1351 | E$_0$ + 4448 | −0.3574 | E$_0$ + 4448 | −0.3603 | E$_0$ + 6526 | −0.5753 | E$_0$ + 6526 | −0.5868 |
| E$_{th}$ + 2370 | −0.1156 | E$_{th}$ + 4448 | −0.3240 | E$_{th}$ + 4448 | −0.3303 | E$_{th}$ + 6526 | −0.5358 | E$_{th}$ + 6526 | −0.5463 |

Figure 5:
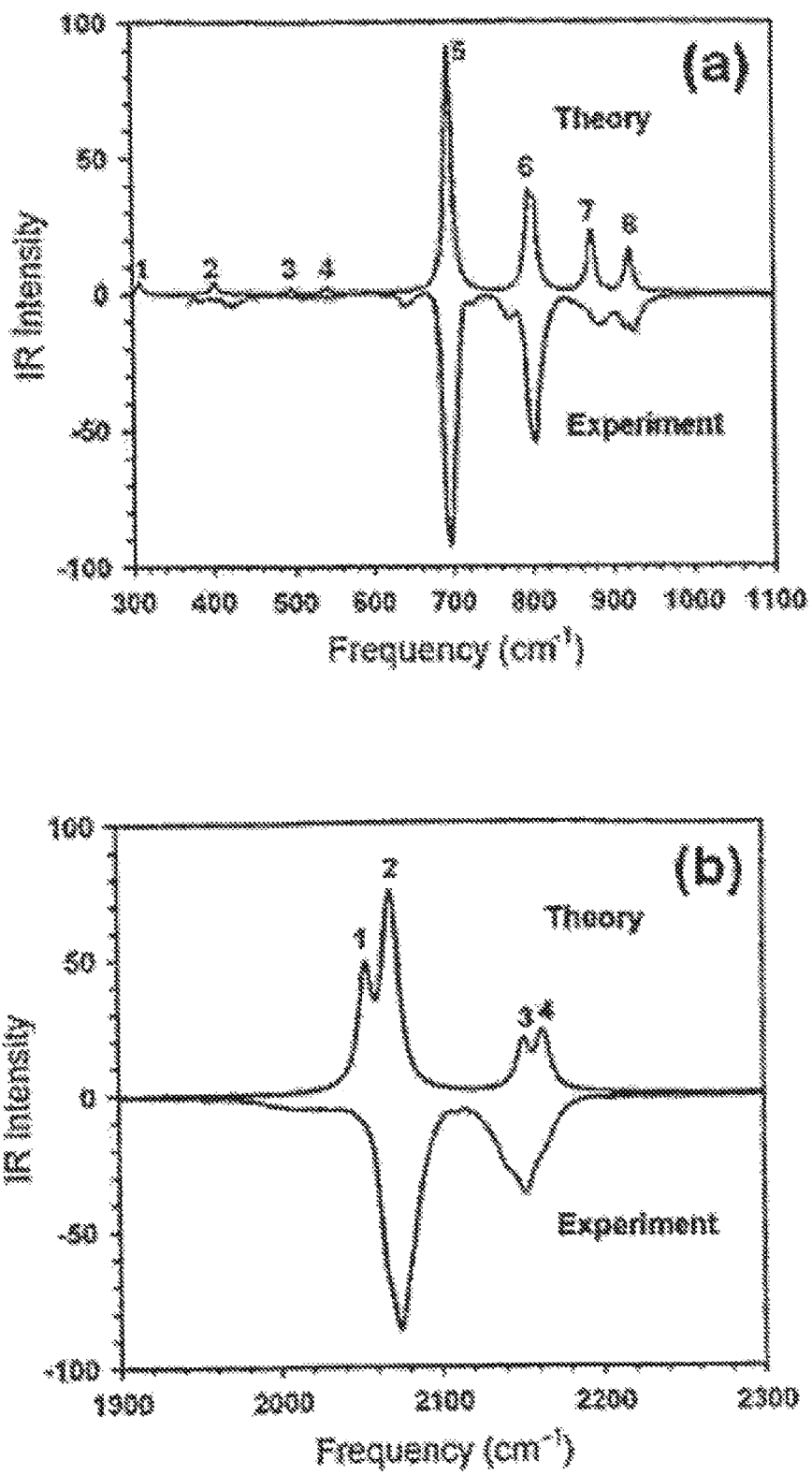
FIG. 5 shows the normalized theoretical and experimental infrared spectra for $SiH_2(GeH_3)_2$ for (a) the low frequency portion of the spectrum and (b) the high frequency hydrogen bands.

The IR spectrum for H$_3$Ge—SiH$_2$—GeH$_3$ was also calculated using the B3LYP functional and the 6-311++G(2d,2p) basis set. FIG. 5 compares the calculated and experimental IR spectra and Table 2 summarizes the frequencies of key vibrational bands and their corresponding assignments and compares the observed and calculated values. Gratifying agreement between experiment and theory is obtained using a uniform frequency scale factor of 0.989 for the low frequency bands (~<1000 cm-1). For the high frequency Si—H and Ge—H vibrations a scale factor of 0.98 is found to yield optimal correspondence with experiment. The latter value was also obtained by Urban et al. in their treatment of Si$_2$H$_6$, Ge$_2$H$_6$ and SiH$_3$GeH$_3$.

TABLE 2

Vibrational mode assignments for the symmetric SiH$_2$(GeH$_3$)$_2$ molecule

| Observed $\nu$(cm$^{-1}$) | Calculated $\nu$(cm$^{-1}$) | SiH$_2$(GeH$_3$)$_2$ | Description |
|---|---|---|---|
| Low Frequency Vibrational Bands ($\lambda$ = 0.989) | | | |
| — | 313.8 | 1 | Symmetric H—Si, H—Ge ∥ wagging |
| 423.8 | 406.8 | 2 | Asymmetric H—Si, H—Ge ∥ wagging |
| 510.7 | 502.2 | 3 | Symmetric Ge—H ∥ wagging |
| 540.0 | 547.8 | 4 | Asymmetric H—Si, H—Ge ⊥ wagging |
| 639.6 | — | | |
| 651.8 | — | | |
| 696.1 | 704.1 | 5 | Symmetric Si—H ∥ wagging + asymmetric Ge—Si stretching |
| 725.1 | — | | |
| 771.1 | — | | |
| 796.5 | 805.4 | 6 | Symmetric H—Ge wagging + H—Si ∥ wagging |
| 803.9 | 812.6 | 6' | Symmetric H—Ge wagging |
| 882.3 | 883.9 | 7 | Asymmetric H—Ge ⊥ wagging |
| 888.8 | 884.0 | 7' | Symmetric H—Ge ⊥ wagging |
| 917.0 | — | | |
| 926.5 | 932.6 | 8 | Strong symmetric H—Si—H ⊥ bending |
| High Frequency Vibrational Bands ($\lambda$ = 0.98) | | | |
| 2013.7 | — | | |
| 2066.0 | 2053.7 | 1 | Symmetric H—Ge stretching (anti-symmetric w.r.t. Ge sites) |
| 2074.1 | 2067.8 | 2 | Symmetric H—Ge stretching |
| | 2071.1 | | Asymmetric H—Ge stretching (symmetric w.r.t. Ge sites) |
| 2109.7 | — | | |
| 2140.7 | 2151.5 | 3 | Symmetrical H—Si stretching |
| 2152.8 | 2163.5 | 4 | Asymmetrical H—Si stretching |
| 2163.6 | — | | |

We also calculated the IR spectrum of the asymmetric GeH$_3$—GeH$_2$—SiH$_3$ isomer (not shown) and found that it is in excellent agreement with the data reported previously by K. M. Mackay, S. T. Hosfield and S. R. Stobart, *J. Chem. Soc.* (A), 1969, 2938. A comparison between the IR spectra of the GeH$_3$—SiH$_2$—GeH$_3$ (FIG. 5) and GeH$_3$—GeH$_2$—SiH$_3$ corroborates the NMR findings that in our experiments we produced almost exclusively the symmetric (GeH$_3$)$_2$SiH$_2$ analog.

Example Synthesis of Digermylsilane, H$_3$Ge—SiH$_2$—GeH$_3$

The following example helps to further explain the invention. It will be understood, however, that the example is illustrative of the invention and that the invention is not limited only to this example.

H$_3$Ge—SiH$_2$—GeH$_3$. A liquid sample of H$_2$Si(OTf)$_2$ (4.38 g, 13.3 mmol) was added dropwise via an addition funnel to a slurry of solid KGeH$_3$ (4.0 g, 34.9 mmol) in 40 mL of dry decane. The slurry was prepared in a 250 mL, two-neck flask using a 33% excess of KGeH$_3$. The addition funnel was attached to the flask and the reaction assembly was evacuated to 0.200 torr. The H$_2$Si(OTf)$_2$ was added at 0° C. The resulting mixture was stirred at ambient temperature for 2 hours after which it was distilled for several hours under dynamic vacuum through a series of −45° C. and −196° C. traps to collect the volatiles. Gas phase IR revealed that the −45° C. trap contained a small fraction of decane and the −196° C. trap contained primarily (H$_3$Ge)$_2$SiH$_2$ with traces of H$_3$SiGeH$_3$, SiH$_4$ and GeH$_4$. The contents of the −196° C. trap were fractionally distilled through a series of U-traps held at −45° C., −90° C., −130° C. and −196° C. Pure (H$_3$Ge)$_2$SiH$_2$ and H$_3$SiGeH$_3$ were collected at −90° C. and −130° C., respectively, while SiH$_4$, and GeH$_4$ were obtained in the −196° C. trap. Traces of solvent were found in the −45° C. trap and subsequently discarded.

From this process, pure digermylsilane (H$_3$Ge)$_2$SiH$_2$ was obtained in a 20-25% yield further characterized as follows:

Vapor pressure: 30 Torr (22° C.), 17 Torr (0° C.).

IR (gas, cm$^{-1}$): 2152 (m), 2074 (vs), 2010 (w, sh), 927 (w), 917 (w), 883 (w), 803 (s), 769 (vw), 723 (vw), 696 (vs), 649 (vw), 641 (vw), 547 (vw), 515 (vw), 424 (vw), 330 (vw).

$^1$H-NMR (CDCl$_3$, 7.24): δ 3.395 (septet, Si—H$_2$, coupling constant 4 Hz), δ 3.110 (triplet, Ge—H$_3$, coupling constant 4 Hz) Use $^3$J$_{(HH)}$=4 Hz, $^1$J$_{(SiH)}$=200 Hz, etc.

$^{29}$Si-NMR: δ=−102.45.

EIMS (m/e): isotopic envelopes centered at 174 (M$^+$-nH), 148 (Ge$_2$H$_x^+$), 106 (H$_3$SiGeH$_3^+$), 75 (GeH$_4^+$), 31 (SiH$_4^+$).

H$_3$GeSiH$_2$(OSO$_2$CF$_3$).

Trifluoromethane sulfonic acid, HOSO$_2$CF$_3$, (0.645 g, 4.3 mmol) was added dropwise to pure PhSiH$_2$GeH$_3$ (0.784 g, 4.3 mmol) at −35° C. under nitrogen. The formation of frozen benzene was immediately observed during the addition process. After addition the mixture was stirred for 30 minutes at −35° C. and subsequently distilled through a series of U-traps held at −25° C. and −196° C. under dynamic vacuum. Gas-phase IR revealed the presence of $H_3GeSiH_2(OSO_2CF_3)$ in the −25° C. trap and a mixture of $H_3SiGeH_3$ and benzene in the −196° C. trap. The identity and purity of the $H_3GeSiH_2(OSO_2CF_3)$ was further established by mass spectrometry and NMR spectroscopy. The Si—H and Ge—H stretching modes were observed at 2155 cm$^{-1}$ and 2071 cm$^{-1}$, respectively, indicating the presence of the $SiH_2GeH_3$ moiety. A series of bands between 1450 cm$^{-1}$ and 1100 cm$^{-1}$ revealed the presence of the triflate ($OSO_2CF_3$) group. The $^1$H NMR resonance revealed a quartet at 5.430 ppm and a triplet at 3.514 ppm corresponding to silyl and germyl proton resonances consistent with the $SiH_2GeH_3$ group. The $^{19}$F and $^{13}$C-NMR spectra revealed the presence of a single fluorine chemical shift at −76.34 ppm and a $^{13}$C quartet at 114-122 ppm, which is consistent with the $CF_3$ moiety of the triflate group.

From this process, 0.760 g of $H_3GeSiH_2(OSO_2CF_3)$ was obtained as a colorless, low volatility liquid in a 72% yield further characterized as follows:

Vapor pressure: 8.0 Torr at 22° C., 3 Torr at 0° C.

IR (gas, cm$^{-1}$): 2194 (w, sh), 2155 (s), 2071 (vs), 1425 (m), 1253 (w), 1225 (ms), 1158 (m), 1077 (s), 964 (ms), 951 (ms), 883 (s), 863 (ms), 844 (w), 792 (s), 763 (vs), 690 (vw), 625 (w), 467 (vw), 434 (vw), 355 (vw).

$^1$H-NMR (CDCl$_3$): δ 5.430 (quartet, Si—H, coupling constant 3.3 Hz), δ 3.514 (triplet, Ge—H, coupling constant 3.3 Hz).

$^{13}$C-NMR (CDCl$_3$): δ 122-114 (quartet, CF$_3$). $^{19}$F-NMR (CDCl$_3$, δ): −76.34 (s, CF$_3$).

EIMS (m/e): isotopic envelopes centered at 179 (M$^+$-GeH$_3$), 149 (CF$_3$SO$_3$$^+$), 150 (Ge$_2$H$_{6-x}$$^+$), 106 (H$_3$SiGeH$_3$$^+$), 75 (GeH$_4$$^+$), 69 (CF$_3$$^+$), 32 (SiH$_4$$^+$).

(b) Synthesis and Properties of Trigermylsilane SiH(GeH$_3$)$_3$

We have also synthesized trigermylsilane (H$_3$Ge)$_3$SiH using a similar procedure to that employed for the (H$_3$Ge)$_2$SiH$_2$ analog described above. The preparation was conducted by the reaction of HSi(OSO$_2$CF$_3$)$_3$, and a slight excess of KGeH$_3$ as shown by the equation below.

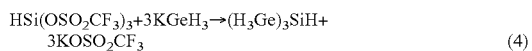

$$HSi(OSO_2CF_3)_3 + 3KGeH_3 \rightarrow (H_3Ge)_3SiH + 3KOSO_2CF_3 \quad (4)$$

Figure 6:
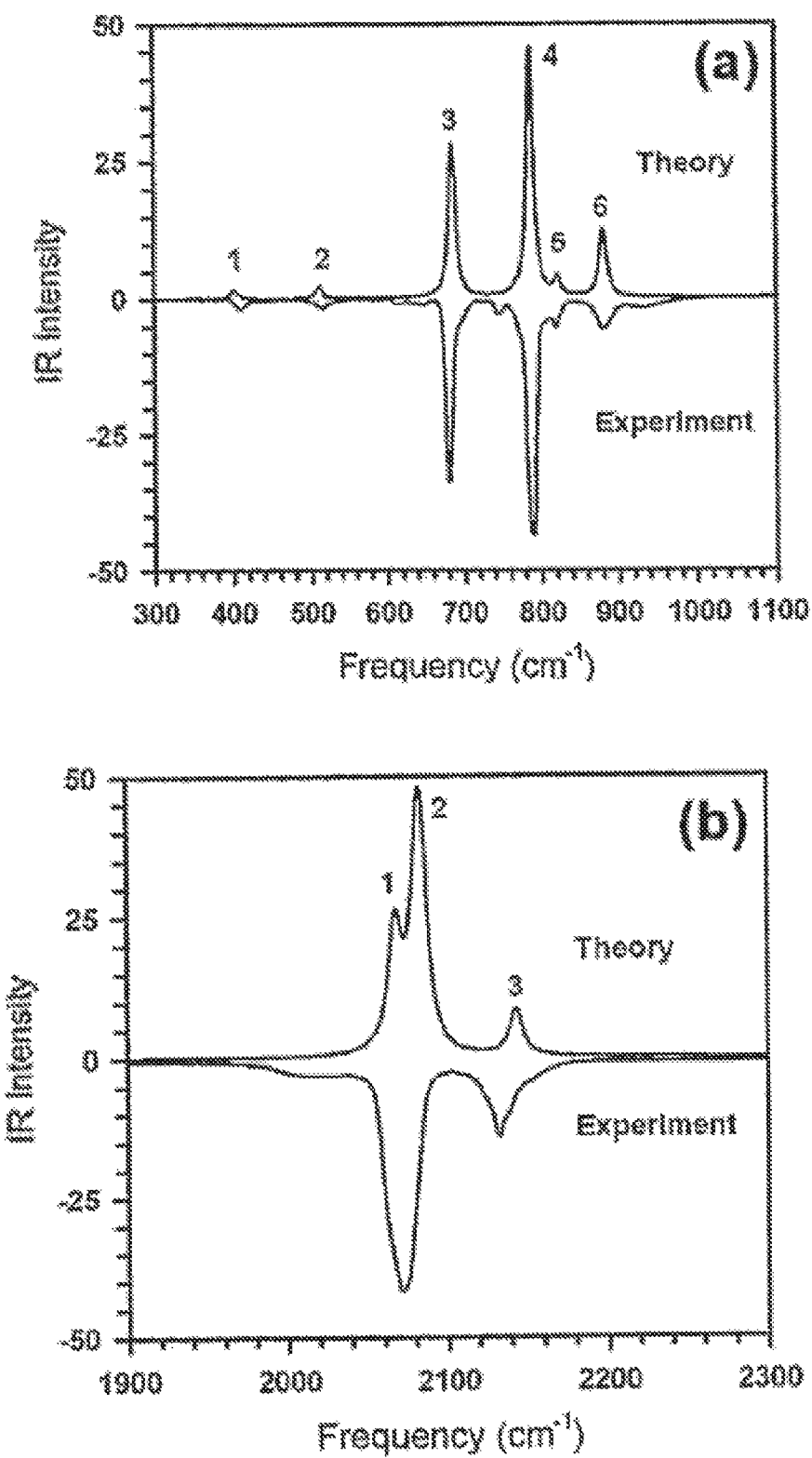
FIG. 6 shows the normalized theoretical and experimental infrared spectra for $SiH(GeH_3)_3$ for (a) the low frequency portion of the spectrum and (b) the high frequency hydrogen bands.

The product was obtained in ~30% yields as a colorless, air-sensitive and volatile liquid with a vapor pressure (of 6-7 Torr at 22° C.) and is stable at 22° C. Extensive NMR, mass spectrometric and IR (including first principle simulations) characterizations indicated that the molecular structure comprised a central Si atom that is bonded to three GeH$_3$ and one H groups similar to isobutane. The $^1$H NMR spectra showed a deciplet at 3.429 ppm and a doublet at 3.317 ppm for the Si—H and Ge—H proton signals, respectively. The splitting patterns of the Si—H and Ge—H protons and their corresponding integrated peak ratio of 1:9 is consistent with the isobutane-like (H$_3$Ge)$_3$SiH structure. Furthermore, a $^{29}$Si-HMQC spectrum revealed a chemical shift of −112.73 ppm and that the $^1$H-NMR signal at 3.429 ppm is coupled with the silicon in trigermylsilane. A $^1$H-COSY experiment confirmed that the Si—H and Ge—H chemical shifts are coupled with one another as expected. The mass spectra show an isotopic envelop at 255-238 amu as the highest mass peak corresponding SiGe$_3$H$_x$. Although the molecule appears to lose readily H in the mass spectrometer the SiGe3 core is retained in the gas phase. The IR spectrum of the compound shows the characteristic Si—H and Ge—H stretching modes at 2071 cm$^{-1}$ and 2132 cm$^{-1}$, respectively, and a set of absorptions at 881 cm$^{-1}$ 788 cm$^{-1}$, and 680 cm$^{-1}$ correspond to prominent bending modes of the molecule. The IR spectrum for (H$_3$Ge)$_3$SiH was also calculated using the B3LYP functional and the 6-311++G(2d,2p) basis set. FIG. 6 compares the calculated and experimental IR spectra and Table 3 summarizes the frequencies of key vibrational bands and their corresponding assignments and compares the observed and calculated values. A close agreement between experiment and theory is obtained.

TABLE 3

Vibrational mode assignments for the symmetric SiH(GeH$_3$)$_3$ molecule.

| Observed ν(cm$^{-1}$) | Calculated ν(cm$^{-1}$) | SiH(GeH$_3$)$_3$ | Description |
|---|---|---|---|
| Low Frequency Vibrational Bands (λ = 0.989) | | | |
| 407.2 | 401.2 | 1 | Symmetric H—Si, H—Ge ∥ wagging |
| 512.3 | 511.9 | 2 | Symmetric GeH$_3$ group rocking |
| 613.4 | — | | |
| 644.0 | — | | |
| 680.5 | 685.7 | 3 | H—Si wagging |
| 745.6 | — | | |
| 787.1 | 787.2 | 4 | H—Si wagging + H—Ge counter-wagging |
| 820.2 | 821.4 | 5 | Symmetric, concerted radial wagging of all H—Ge's |
| 882.3 | 880.0 | 6 | Asymmetric (w.r.t. Ge) radial wagging of all H—Ge's |
| | 880.8 | | |
| | 883.8 | | |
| 929.4 | — | | |
| High Frequency Vibrational Bands (λ = 0.98) | | | |
| 2020.3 | — | | |
| 2059.8 | 2066.4 | 1 | Asymmetric H—Ge stretching (anti-symmetric w.r.t. Ge sites) |
| | 2068.0 | | |
| 2072.1 | 2080.8 | 2 | Asymmetric H—Ge stretching (⊥ to H—Si bond) |
| | 2082.9 | | Symmetric H—Ge stretching (⊥ to H—Si bond) |
| | 2084.3 | | Symmetric H—Ge stretches (∥ to H—Si bond) |
| 2132.2 | 2143.2 | 3 | H—Si stretching |
| 2140.1 | | | |
| 2157.6 | — | | |

Example Synthesis of Trigermylsilane, (H$_3$Ge)$_3$SiH

The following example helps to further explain the invention. It will be understood, however, that the example is illustrative of the invention and that the invention is not limited only to this example.

A liquid sample of HSi(OTf)$_3$ (4.10 g, 8.6 mmol) was added drop wise via an addition funnel to a slurry of solid KGeH$_3$ (4.5 g, 39.2 mmol) in 40 mL of dry ether at −35° C. The slurry was prepared in a 100 mL, two-neck flask using a 20% excess of KGeH$_3$. The addition funnel was attached to the flask and the reaction assembly was evacuated to 300 torr. The resulting mixture was stirred at −35° C. for 30 minutes after which it was slowly warmed to ambient temperature over the course of 90 minutes. A colorless solid was observed and the mixture was stirred at ambient temperature for 5 hrs. The volatiles were distilled into a U-trap held at −196° C. under dynamic vacuum for 2½ hours. The contents of the trap were redistilled through a series of traps held at −40° C. (H$_3$Ge)$_3$SiH and trace ether), −78° C. (ether and traces of H$_3$Ge)$_2$SiH$_2$) and 196° C. (ether and traces of GeH4). The product (−40° C. trap) was obtained by repeated distillation through −25° C. and −78° C. traps with no pumping. Gas phase IR revealed that the −25° C. trap contained trigermylsilane and the −78° C. trap contained a small amount of (H$_3$Ge)$_2$SiH$_2$.

From this process, trigermylsilane $(H_3Ge)_3SiH$ was obtained in a yield of 25-30% further characterized as follows:

Vapor pressure: 6 torr (22° C.).

IR (gas, cm$^{-1}$): 2132 (m), 2071 (vs), 2010 (w, sh), 922 (vw), 881 (w), 788 (vs), 745 (vw), 680 (s), 634 (vw), 606 (w), 514 (vw), 409 (vw).

$^1$H-NMR (CDCl$_3$, 7.24, at 5° C.): δ 3.429 (deciplet, Si—H, coupling constant 4 Hz), δ 3.317 (doublet, Ge—H$_3$, coupling constant 4 Hz):

$^{29}$Si-NMR (CDCl$_3$, at 5° C.): δ −112.73.

GCMS: m/z 255-238 (SiGe$_3$H$_x$), 230-213 (Ge$_3$H$_x$), 185-170 (SiGe$_2$H$_x$), 154-140 (Ge$_2$H$_x$), 109-100 (SiGeH$_x$), 77-71 (GeH$_x$).

(c) Synthesis and Properties of Tetragermylsilane Si(GeH$_3$)$_4$

The preparation of the tetragermylsilane $(H_3Ge)_4Si$ was conducted by the reaction of $Cl_2Si(OSO_2CF_3)_2$, $ClSi(OSO_2CF_3)_3$ or $Si(OSO_2CF_3)_4$ with $KGeH_3$ as shown by the following equations:

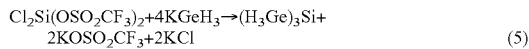

$$Cl_2Si(OSO_2CF_3)_2 + 4KGeH_3 \rightarrow (H_3Ge)_3SiH + 2KOSO_2CF_3 + 2KCl \quad (5)$$

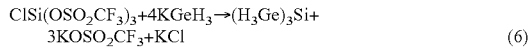

$$ClSi(OSO_2CF_3)_3 + 4KGeH_3 \rightarrow (H_3Ge)_3SiH + 3KOSO_2CF_3 + KCl \quad (6)$$

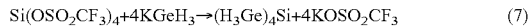

$$Si(OSO_2CF_3)_4 + 4KGeH_3 \rightarrow (H_3Ge)_4Si + 4KOSO_2CF_3 \quad (7)$$

Figure 7:
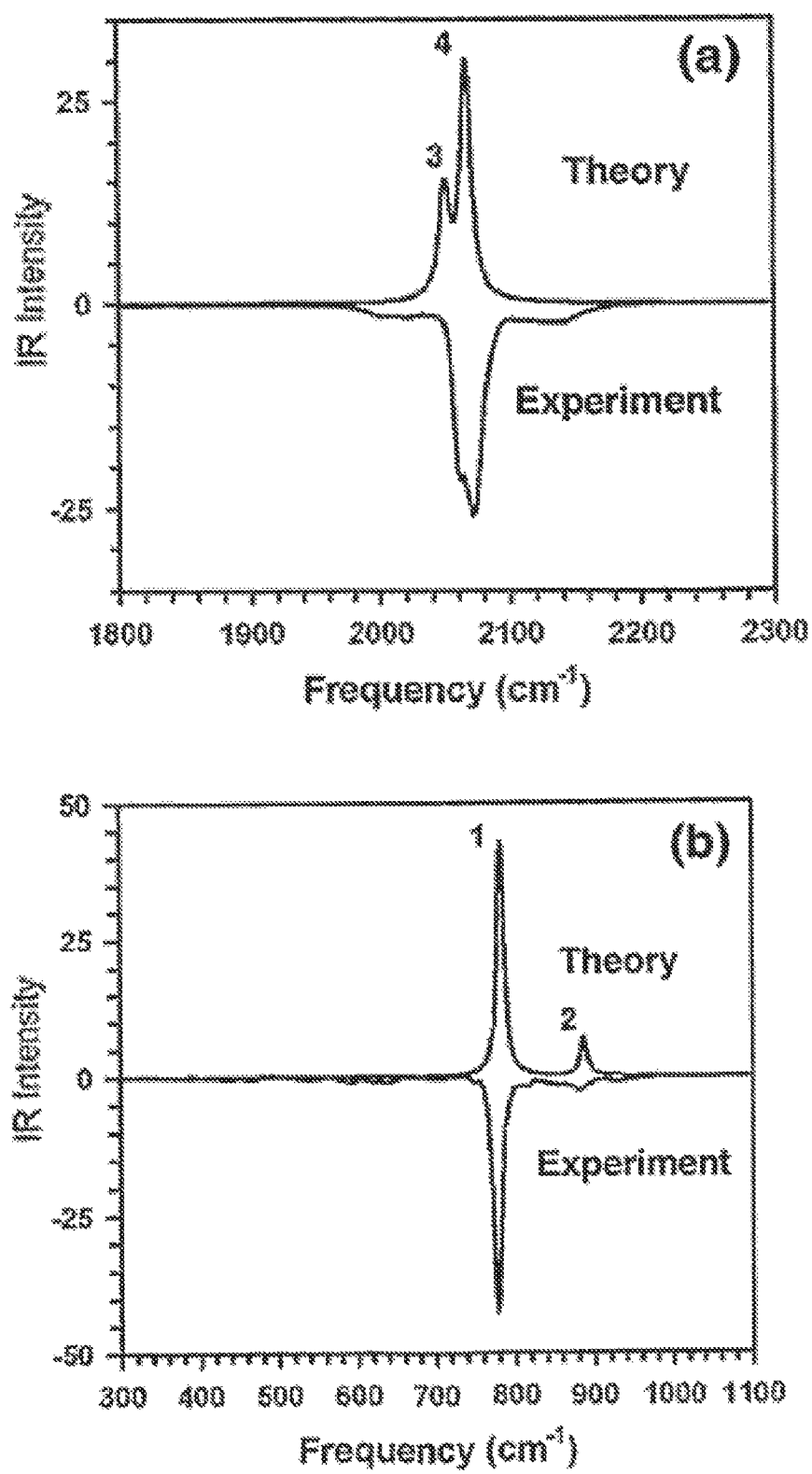
FIG. 7 shows the normalized theoretical and experimental infrared spectra for $Si(GeH_3)_4$ for (a) the low frequency portion of the spectrum and (b) the high frequency hydrogen bands.

The $(H_3Ge)_4Si$ compound is a colorless liquid with ~1-2 Torr vapor pressure at 22° C. and was characterized by FTIR, NMR and GCMS. The high symmetry of the molecule leads to an extremely simple IR spectrum, which shows absorptions at 2072 cm$^{-1}$ and 2062 cm$^{-1}$ corresponding to the symmetric and asymmetric Ge—H stretches respectively. The peak positions and relative intensities in the MK closely match closely the calculated spectrum (see FIG. 7 and Table 4 for theoretical and experimental IR spectra and corresponding peak assignments). No Si—H vibrational modes are detected by MR. The NMR spectrum shows a singlet at 3.40 ppm, which confirms the presence of single-environment GeH$_3$ ligands in the molecule. The highest mass peak in the GCMS spectrum is observed in the range of 328-318 amu. The peak position and the isotopic distribution indicate SiGe4H$_x$ type species consistent with the Si(GeH$_3$)$_4$ tetrahedral structure of the molecule. The spectroscopic data collectively provide strong evidence for the successful synthesis and isolation of Si(GeH$_3$)$_4$. Moreover, a vapor pressure of ~1-2 Torr for the compound is within the expected value and is similar to that reported for C(GeH$_3$)$_4$ (1-2 torr).

TABLE 4

Vibrational mode assignments for the Si(GeH$_3$)$_4$ molecule

| Observed v(cm$^{-1}$) | Calculated v(cm$^{-1}$) | Si(GeH$_3$)$_4$ | Description |
|---|---|---|---|
| Low Frequency Vibrational Bands (λ = 0.989) ||||
| 778.2 | 781.6 | 1 | Symmetric & Asymmetric axial H—Ge bending (rigid SiGe4 framework) |
| 880.6 | 886.8 | 2 | Asymmetrical H—Ge wagging |
| High Frequency Vibrational Bands (λ = 0.98) ||||
| 2002.5 | — | | |
| 2019.0 | — | | |
| 2060.2 | 2051.1 | 3 | Symmetric H—Ge stretching (anti-symmetric w.r.t. Ge sites) |
| 2070.8 | 2066.3 | 4 | Symmetric H—Ge stretching |
| 2134.0 | — | | |

Example Synthesis of Tetragermylsilane, $(H_3Ge)_4Si$

The following example helps to further explain the invention. It will be understood, however, that the example is illustrative of the invention and that the invention is not limited only to this example.

A 3-neck, 100 mL round bottom flask was charged with 2.98 g (26 mmol) of KGeH$_3$ and 50 mL of dry diethyl ether to form a solution. A liquid sample of Si(OTf)$_4$ (2.40 g, 6 mmol) was subsequently added to KGeH$_3$/ether over the course of 30 minutes at −50° C. The pressure in the reaction assembly was reduced to 300 torr prior to the addition of Si(OTf)$_4$. Once the addition was completed, the flask was slowly warmed to ambient temperature over the course of 2-3 hours. A build up of a colorless solid was observed in the reaction pot and the mixture was stirred at ambient temperature for 90 minutes after which the volatiles were condensed into a U-trap at −196° C. under dynamic vacuum. The contents of the −196° C. trap were redistilled through a −45° C. trap to collect a mixture of $(H_3Ge)_3SiH$ and $(H_3Ge)_4Si$ as colorless liquids. Final fractionation of the mixture was accomplished by distillation through U-traps cooled at −10° C. and −45° C. Gas-phase IR spectroscopy revealed that the −10° C. trap contained $(H_3Ge)_4Si$ and the −45° C. trap contained $(H_3Ge)_3SiH$.

From this process, tetragermylsilane, $(H_3Ge)_4Si$, was obtained, characterized as follows:

Vapor pressure: 1-2 Torr (22° C.).

IR (gas, cm$^{-1}$): 2130 (vw, sh), 2072 (s), 2062 (s), 2020 (vw, sh), 881 (vw), 777 (vs), 680 (vw), 632 (vw).

$^1$H-NMR (C$_6$D$_6$, 7.15): δ 3.400 (singlet, Ge—H).

GCMS: m/z 328-318 (SiGe4Hx), 302-292 (Ge4Hx), 255-238 (SiGe3Hx), 230-213 (Ge3Hx), 185-170 (SiGe2Hx), 154-140 (Ge2Hx), 109-100 (SiGeHx), 77-71 (GeHx).

Our method has provided pure $(H_3Ge)_4Si$ product in 5-10% yield. As evidenced by mass spectrometry (GCMS), gas phase IR, NMR data, our method produces a compound with the correct stoichiometry and with the correct ¼ Si:Ge elemental ratio in the compound. Our spectroscopic data was further corroborated by ab initio theoretical studies.

(d) Methods of Synthesis and Properties of Trisilane, H$_2$Si(SiH$_3$)$_2$, and iso-tetrasilane, HSi(SiH$_3$)$_3$ The previously described triflate-based methods to prepare silyl-germanes were also employed to synthesize the homologous trisilane, $(H_3Si)_2SiH_2$, as described by the equation:

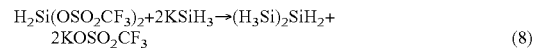

$$H_2Si(OSO_2CF_3)_2 + 2KSiH_3 \rightarrow (H_3Si)_2SiH_2 + 2KOSO_2CF_3 \quad (8)$$

As will be apparent to one of skill in the art, the iso-tetrasilane $(H_3Si)_3SiH$ analogs can be obtained as described by the equation:

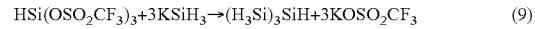

$$HSi(OSO_2CF_3)_3 + 3KSiH_3 \rightarrow (H_3Si)_3SiH + 3KOSO_2CF_3 \quad (9)$$

Trisilane is currently the preferred gas source for commercial CVD growth of strained Si channel devices with highly enhanced electronic properties such as high electron and hole mobilities. The strained films are formed on Si substrates via graded buffer layers of Si—Ge using low temperature growth conditions to prevent strain relaxation and formation of defects. A major advantage of trisilane in strained Si applications relative to traditional Si hydrides such as SiH$_4$ and Si$_2$H$_6$ is its higher reactivity, leading to facile dehydrogenations at the required low-temperature range.

The tetrasilane $(H_3Si)_3SiH$ compound has not yet been used in CVD of Si-based devices, although it is expected to be more suitable for low-temperature growth applications because of its higher reactivity and hence lower decomposition temperature relative to trisilane. The branched structure suggests that this compound is likely to be stable and possess significant volatility at room-temperature comparable to trisilane. It is thus expected to be a viable CVD source for commercial, large-scale applications and its full development warrants immediate consideration. There are several accounts for the possible existence of this compound but no definitive synthesis route and characterization of its properties have been reported to date.

Example Synthesis of Trisilane, $Si_3H_8$

The following example helps to further explain the invention. It will be understood, however, that the example is illustrative of the invention and that the invention is not limited only to this example.

A 3-neck, 100 mL round bottom flask was charged with 1.60 g (22.8 mmol) of $KSiH_3$ and 40 mL of ether was subsequently added to form a light-orange solution. A liquid sample of $H_2Si(OTf)_2$ (3.58 g, 10.9 mmol) was subsequently added to $KSiH_3$/ether over the course of 30 minutes at $-40°$ C. The pressure in the reaction assembly was reduced to 10 torr prior to the addition of $H_2Si(OTf)_2$. Frothing was immediately observed upon addition of the triflate in which the volatiles were frequently trapped during the addition process by passing through $-78°$ C. and $-196°$ C. traps. Once the addition was completed, the flask was slowly warmed to ambient temperature with frequent trapping. A build up of an off-white solid was observed in the reaction pot and the mixture was stirred at ambient temperature for 30 minutes. The volatiles from each trap were subsequently combined and redistilled through $-125°$ C. and $-196°$ C. U-traps with no pumping. The contents of each trap were checked by gas-phase FTIR spectroscopy, which revealed the presence of trisilane ($-125°$ C.) and a mixture of silane and disilane ($-196°$ C.).

This process yielded 80 mg of trisilane, $Si_3H_8$, was obtained in a yield of 15%-20% and further characterized as follows:

IR (gas, cm$^{-1}$): 2210 (vw, sh), 2161 (vs), 1003 (vw, br), 941 (m), 880 (vs), 802 (vw), 748 (vw), 716 (s), 705 (s), 673 (vw), 589 (vw, br), 472 (vw), 442 (vw).

EIMS (m/z): 92-84 ($Si_3H_{8-x}$), 62-56 ($Si_2H_{6-x}$), 32-28 ($SiH_{4-x}$).

CONCLUSION

The above-described invention possesses numerous advantages as described herein. The invention in its broader aspects is not limited to the specific details, representative devices, and illustrative examples shown and described. Accordingly, departures may be made from such details without departing from the spirit or scope of the general inventive concept.

What is claimed is:

1. A method of synthesizing a silicon hydride $(H_3Si)_{4-x}SiH_x$, wherein x is equal to 1 or 2, the method comprising:
    combining a silane triflate with a compound comprising a $SiH_3$ ligand under conditions whereby the silicon hydride is formed, wherein
    the silane triflate comprises a compound selected from the group consisting of $H_xSi(OSO_2CF_3)_{4-x}$ and $H_xSi(OSO_2C_4F_9)_{4-x}$.

2. The method of claim 1 wherein the silane triflate comprises $H_xSi(OSO_2CF_3)_{4-x}$.

3. The method of claim 1 wherein the silane triflate comprises $H_xSi(OSO_2C_4F_9)_{4-x}$.

4. A method of synthesizing a compound $(H_3Si)_2SiH_2$, the method comprising:
    combining $H_2Si(triflate)_2$, with $KSiH_3$ under conditions whereby $(H_3Si)_2SiH_2$ is obtained according to the equation:

$H_2Si(triflate)_2 + 2KSiH_3 \rightarrow (H_3Si)_2SiH_2 + 2 K(triflate)$.

5. The method of claim 4 wherein the triflate comprises $OSO_2CF_3$.

6. The method of claim 4 wherein the triflate comprises $OSO_2C_4F_9$.

7. A method of synthesizing a compound $(H_3Si)_3SiH$, the method comprising: combining $HSi(triflate)_3$ with $KSiH_3$ under conditions whereby $(H_3Si)_3SiH$ is obtained according to the equation:

$HSi(triflate)_3 + 3KSiH_3 \rightarrow (H_3Si)_3SiH + 3 K(triflate)$.

8. The method of claim 7 wherein the triflate comprises $OSO_2CF_3$.

9. The method of claim 7 wherein the triflate comprises $OSO_2C_4F_9$.

* * * * *